(12) United States Patent
Zhang

(10) Patent No.: US 11,340,494 B2
(45) Date of Patent: May 24, 2022

(54) BACKLIGHT MODULE AND DISPLAY DEVICE

(71) Applicant: WUHAN CHINA STAR OPTOELECTRONICS TECHNOLOGY CO., LTD., Wuhan (CN)

(72) Inventor: Peng Zhang, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 262 days.

(21) Appl. No.: 16/622,936

(22) PCT Filed: May 16, 2019

(86) PCT No.: PCT/CN2019/087145
§ 371 (c)(1),
(2) Date: Dec. 16, 2019

(87) PCT Pub. No.: WO2020/186616
PCT Pub. Date: Sep. 24, 2020

(65) Prior Publication Data
US 2021/0364853 A1    Nov. 25, 2021

(30) Foreign Application Priority Data

Mar. 15, 2019   (CN) .......................... 201910196748.6

(51) Int. Cl.
*G02F 1/00*   (2006.01)
*G02F 1/13357*   (2006.01)
*G02F 1/1335*   (2006.01)

(52) U.S. Cl.
CPC .. *G02F 1/133603* (2013.01); *G02F 1/133514* (2013.01); *G02F 1/133605* (2013.01)

(58) Field of Classification Search
CPC ........ G02F 1/133603; G02F 1/14; G02F 1/05; G02F 1/133514; G02B 6/0021
See application file for complete search history.

(56) References Cited

U.S. PATENT DOCUMENTS 8,253,887 B2 *  8/2012  Jung .................... G02B 6/0091
                                                        349/65
9,784,911 B2 * 10/2017  Jung .................... G02B 6/0091
(Continued)

FOREIGN PATENT DOCUMENTS

CN    102518988 A    6/2012
CN    203162732 U    8/2013
(Continued)

*Primary Examiner* — Gerald J Sufleta, II
(74) *Attorney, Agent, or Firm* — JMB Davis Ben-David

(57) ABSTRACT

The present invention provides a backlight module and a display device. A first notch is defined in a back plate of the backlight module. The first notch corresponds to a second notch defined in the display panel, and a light source set is disposed on the back plate located on two sides of the first notch, which lowers a dimension of a lower bezel of the display device and enhances a screen ratio such that light of the backlight module entering the display panel becomes more uniform, which enhances the differential performance of the products and improves the market competitiveness of the products.

18 Claims, 10 Drawing Sheets

(56) References Cited

U.S. PATENT DOCUMENTS

| | | | | |
|---|---|---|---|---|
| 2005/0052860 A1* | 3/2005 | Tsai | ............... | G02B 6/0083 362/97.3 |
| 2007/0008739 A1* | 1/2007 | Kim | ............... | G02B 6/0021 362/612 |
| 2008/0007673 A1* | 1/2008 | Shiraishi | ............ | G02B 6/0031 349/65 |
| 2009/0237592 A1* | 9/2009 | Mizutani | ............ | G02B 6/0091 349/62 |
| 2010/0165658 A1* | 7/2010 | Huang | ............... | G02B 6/0018 362/606 |
| 2012/0176814 A1* | 7/2012 | Chung | ............... | G02B 6/009 362/613 |
| 2013/0016309 A1* | 1/2013 | Wang | ............... | G02B 6/0078 349/62 |
| 2013/0121020 A1 | 5/2013 | Liu | | |
| 2014/0218970 A1* | 8/2014 | Wu | ............... | G02B 6/0061 362/612 |
| 2014/0226363 A1* | 8/2014 | Kwon | ............... | G02B 6/0021 362/613 |
| 2015/0078034 A1* | 3/2015 | Li | ............... | G02B 6/0021 362/613 |
| 2017/0254941 A1* | 9/2017 | Fan | ............... | G02B 6/0021 |
| 2018/0231840 A1* | 8/2018 | Xie | ............... | G02B 6/0016 |
| 2019/0004244 A1* | 1/2019 | Chen | ............... | G02B 6/0081 |

FOREIGN PATENT DOCUMENTS

| | | | |
|---|---|---|---|
| CN | 108663861 A | * | 10/2018 |
| JP | 5294080 B2 | | 9/2013 |

\* cited by examiner

BACKLIGHT MODULE AND DISPLAY DEVICE

CROSS-REFERENCE TO RELATED APPLICATIONS

This is the U.S. National Stage of International Patent Application No. PCT/CN2019/087145 filed May 16, 2019, which in turn claims the benefit of Chinese Patent Application No. 201910196748.6 filed Mar. 15, 2019.

FIELD OF INVENTION

The present invention relates to fields of display technologies, especially to a backlight module and a display device.

BACKGROUND OF INVENTION

With the development of liquid crystal display technology, especially the development of the full screen technology, screen ratio keeps of display devices increasing. a lower bezel of a liquid crystal module (LCD Module, LCM) becomes smaller. Nowadays, a lower bezel of the display device employing a chip-on-film (Chip On film, COF) technology to decrease a width of the lower bezel is one of approaches for achieving high screen ratio of the display device. Therefore, it is more and more demanding for narrowing a lower bezel of a backlight module (BLU) of the display device to improve the screen ratio of the display device.

With reference to FIGS. 1A and 1B are schematic front views of a conventional backlight module 100' and a conventional display device 10. The backlight module 100' includes a back plate 11', a light guide plate 12' and a light source set 13'. The display device 10' includes the backlight module 100' and a display panel 200'. The display panel 200' includes an array substrate 21', a color filter substrate 22' disposed opposite to the array substrate 21', and a chip-on-film 23' bonded to the array substrate 21'. The array substrate 21' includes a displaying region 211' and a non-displaying region 212' located adjacent to the displaying region 211'. A height of a lower bezel (LCM outline) of the display device 10' d is a distance from a lower edge of the displaying region (CELL VA) 211' to a lower edge of the display device 10', i.e., a sum d of a distance a between the displaying region 211' and a viewable area the backlight module 100' (BLU VA), a distance b between the viewable area of the backlight module 100' and a lower edge (BLU outline) of the backlight module 100' and a distance c between the lower edge of the backlight module 100' and the lower edge of the display device 10', i.e., d=a+b+c.

The display device 10' on the current stage, mainly by increasing a density of arrangement of the light source set 13', reduces light mixture distance to narrow the lower bezel, i.e., the screen ratio is improved by reducing the distance b between the viewable area of the backlight module 100' and the edge of the backlight module 100'. However, as the lower bezel becomes narrower, a space for the arrangement of the light source set 13' is limited and results in that the density of the arrangement of the light source set 13' cannot increase such that it is impossible to increase the density of the arrangement of the light source set 13' (increase of b value) to reduce a dimension of the lower bezel of the display device 10' for improvement of the screen ratio.

Therefore, it is necessary to provide a new backlight module and a new display device to solve the above technical issue.

SUMMARY OF INVENTION

Technical Issue

The present invention provides a backlight module and a display device that solve the technical issue that as the lower bezel becomes narrower, a space for the arrangement of the light source set is limited and results in that the density of the arrangement of the light source set cannot increase such that it is impossible to increase the density of the arrangement of the light source set to reduce a dimension of the lower bezel of the display device for improvement of the screen ratio.

Technical Solution

To solve the above technical issue, the present invention provides technical solutions as follows.

The present invention embodiment provides a backlight module, including:

a back plate; and a light guide plate disposed on the back plate, and the light guide plate comprising a light incident surface and a light emitting surface;

wherein a first notch is defined in an end of the back plate close to the light incident surface of the light guide plate, the first notch divides two parts of the back plate on opposite sides of the first notch into a first light source disposing region and a second light source disposing region, the first notch is rectangular, wherein the first light source disposing region is installed with a first light source set, the second light source disposing region is installed with a second light source set, light emitting sides of the first light source set and the second light source set are both disposed opposite to the light incident surface of the light guide plate.

In the backlight module provided by an embodiment of the present invention, a width of the first notch is 1%-50% of a width of the back plate.

In the backlight module provided by an embodiment of the present invention, a first recessed portion and a second recessed portion are disposed on an edge of the light guide plate close to the light incident surface, a protruding portion is formed between the first recessed portion and the second recessed portion, and a side surface of the protruding portion corresponds to the first notch.

In the backlight module provided by an embodiment of the present invention, the first recessed portion comprises a first perpendicular surface and a first tilted surface, the second recessed portion comprises a second perpendicular surface and a second tilted surface, the first tilted surface and the second tilted surface are both connected to an edge of the protruding portion.

In the backlight module provided by an embodiment of the present invention, a first included angle defined between the first tilted surface and the first perpendicular surface is a non-acute angle, and a second included angle defined between the second tilted surface and the second perpendicular surface is a non-acute angle.

In the backlight module provided by an embodiment of the present invention, the first included angle is 90°-135°, the second included angle is 90°-135°.

In the backlight module provided by an embodiment of the present invention, an edge of the protruding portion is linear or curved.

In the backlight module provided by an embodiment of the present invention, the first light source set comprises a plurality of light emitting diode (LED) lamps disposed at even intervals along a length direction thereof, and the second light source set comprises a plurality of LED lamps disposed at even intervals along a length direction thereof.

In the backlight module provided by an embodiment of the present invention, the backlight module further includes:

an optical film disposed on a side of the light emitting surface of the light guide plate;

a reflection plate disposed on a side of the light guide plate facing away from the light emitting surface; and a sealing glue frame disposed on the back plate.

The present invention embodiment provides a display device including the above backlight module and a display panel, the display panel including an array substrate, a color filter substrate disposed opposite to the array substrate and a chip-on-film bonded to the array substrate;

the array substrate comprising a displaying region and a non-displaying region located adjacent to the displaying region;

wherein a second notch is defined in an end of the non-displaying region away from the displaying region, the second notch corresponds to the first notch, the chip-on-film is bonded in the non-displaying region close to the first edge of the second notch, the chip-on-film sequentially extends through the second notch and the first notch and is folded to a back of the backlight module.

In the display device provided by an embodiment of the present invention, a folding vertex of the chip-on-film is located in the first notch and the second notch.

In the display device provided by an embodiment of the present invention, an orthographic projection of the second notch on the backlight module is located out of an orthographic projection of the first notch on the backlight module.

Advantages

Advantages of the present invention are as follows. The backlight module and the display device provided by the present invention, by defining the first notch in the back plate of the backlight module with the first notch corresponding to a second notch of the display panel and by placing the light source set on the back plate on two ends of the first notch, reduces the dimension of the lower bezel of the display device, increases the screen ratio of the display device, and simultaneously makes incident light from the backlight module to the display panel more uniform, which enhances the differential performance of the products and improves the market competitiveness of the products.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

FIG. 4B is a schematic side view of the light guide plate in

FIG. 4A;

DETAILED DESCRIPTION OF PREFERRED EMBODIMENTS

Figure 1A:
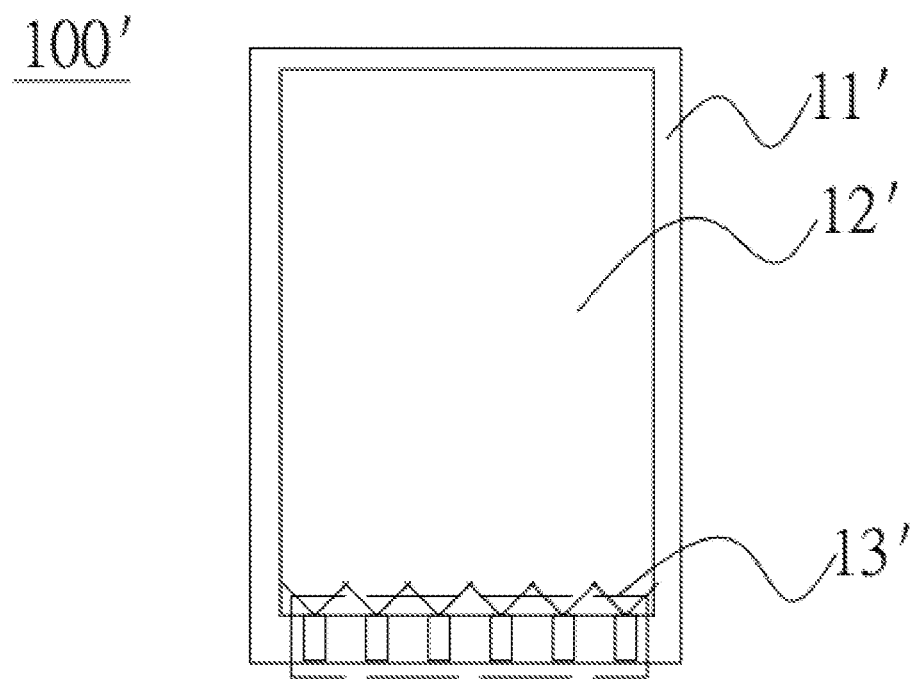
FIG. 1A is a schematic front view of a conventional backlight module.
Figure 1B:
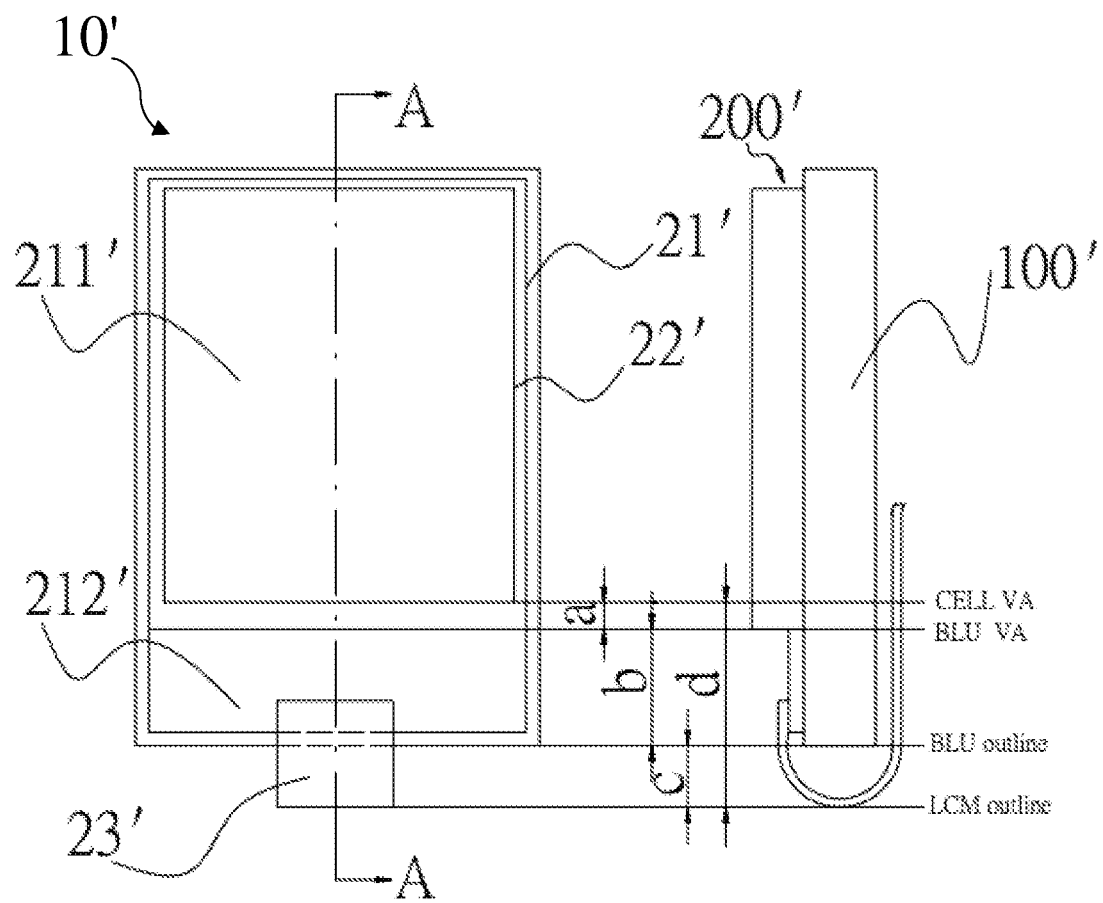
FIG. 1B is a schematic front view of a conventional display device.

Each of the following embodiments is described with appending figures to illustrate specific embodiments of the present invention that are applicable. The terminologies of direction mentioned in the present invention, such as "upper", "lower", "front", "rear", "left", "right", "inner", "outer", "side surface", etc., only refer to the directions of the appended figures. Therefore, the terminologies of direction are used for explanation and comprehension of the present invention, instead of limiting the present invention. In the figures, units with similar structures are marked with the same reference characters.

The present invention aims at the technical issue of the conventional backlight module and display device that the technical issue that as the lower bezel becomes narrower, a space for the arrangement of the light source set is limited and results in that the density of the arrangement of the light source set cannot increase such that it is impossible to increase the density of the arrangement of the light source set to narrow the lower bezel of the display device. The embodiment can solve the technical solution.

First Embodiment

Figure 2:
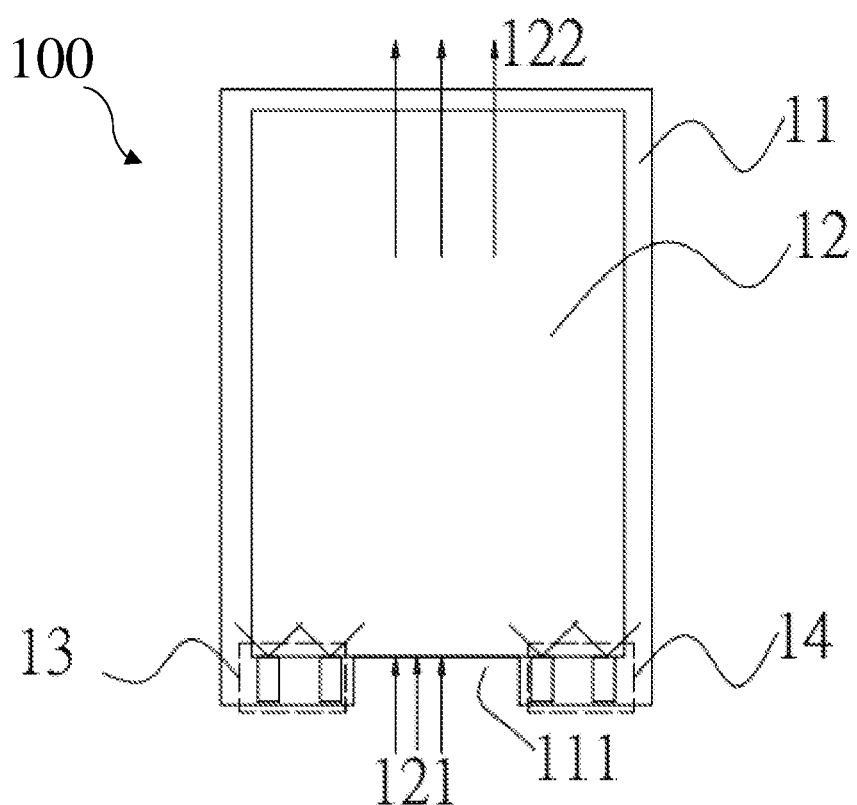
FIG. 2 is a schematic front view of a backlight module by a first embodiment of the present invention.

With reference to FIG. 2, a backlight module 100 provided by the present invention embodiment includes:

a back plate 11; and a light guide plate 12 disposed on the back plate 11, and the light guide plate 12 including a light incident surface 121 and a light emitting surface 122, wherein the light incident surface 121 is located on a side surface of the light guide plate 12, and the light emitting surface 121 is located above the light guide plate 12.

A first notch 111 is defined in an end of the light incident surface 121 of the back plate 11 close to the light guide plate 12. The first notch 111 divides two parts of the back plate 11 on opposite sides of the first notch 111 into a first light source disposing region and a second light source disposing region. The first light source disposing region is installed with a first light source set 13, and the second light source disposing region is installed with a second light source set 14. Light emitting sides of the first light source set 13 and the second light source set 14 are both disposed opposite to the light incident surface 121 of the light guide plate 12.

The first notch 111 is rectangular, and a width of the first notch 111 is 1%-50% of a width of the back plate 11. In one aspect, the width of the first notch 111 should allow a chip-on-film (COF) to be able to extend through the first notch 111 to be folded. In another aspect, the width of the first notch 111 can provide a sufficient space for the first light source disposing region and second light source disposing region to respectively accommodate the first light source set 13 and the second light source set 14 such that the backlight module 100 can provide the display panel with light of sufficient intensity.

Figure 3:
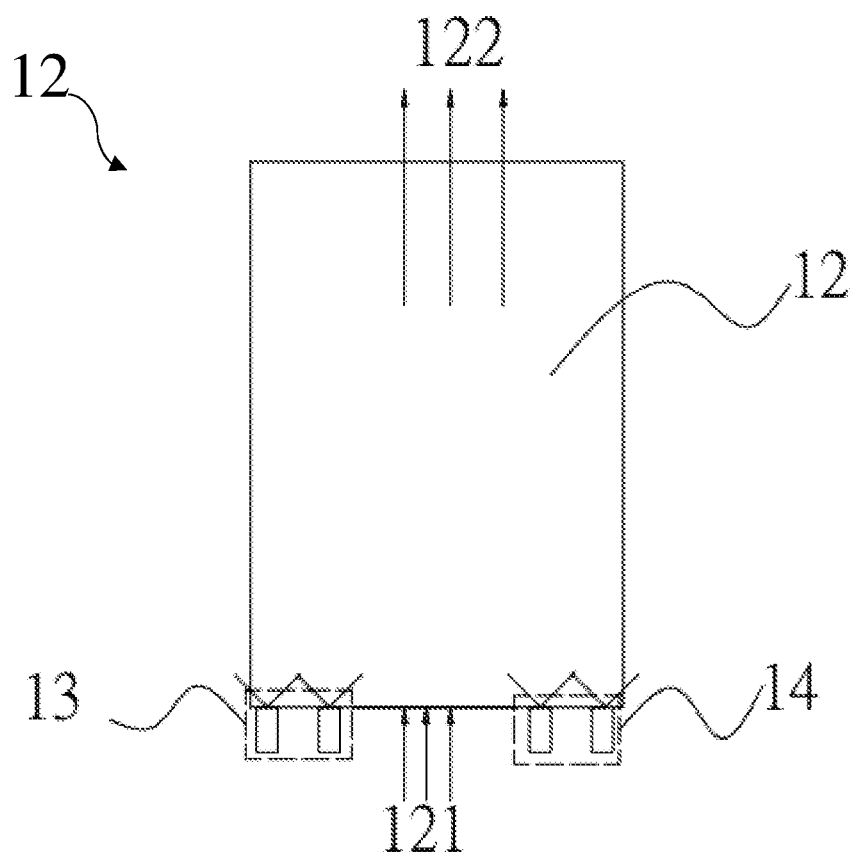
FIG. 3 is a schematic front view of a light guide plate by the first embodiment of the present invention.

With reference to FIG. 3 that is a schematic front view of a light guide plate 12 by the embodiment of the present invention, the light guide plate 12 is rectangular, the first light source set 13 and the second light source set 14 are disposed on two sides of the light guide plate 12 respectively and are disposed opposite to a partial region of the light incident surface 121 of the light guide plate 1. Light emitted from the first light source set 13 and the second light source set 14 enters the region. However, other partial region of the light incident surface 121 not opposite to the first light source set 13 and the second light source set 14 receives no incident light, which easily causes incident light in the light guide plate 12 to be uneven.

Figure 4A:
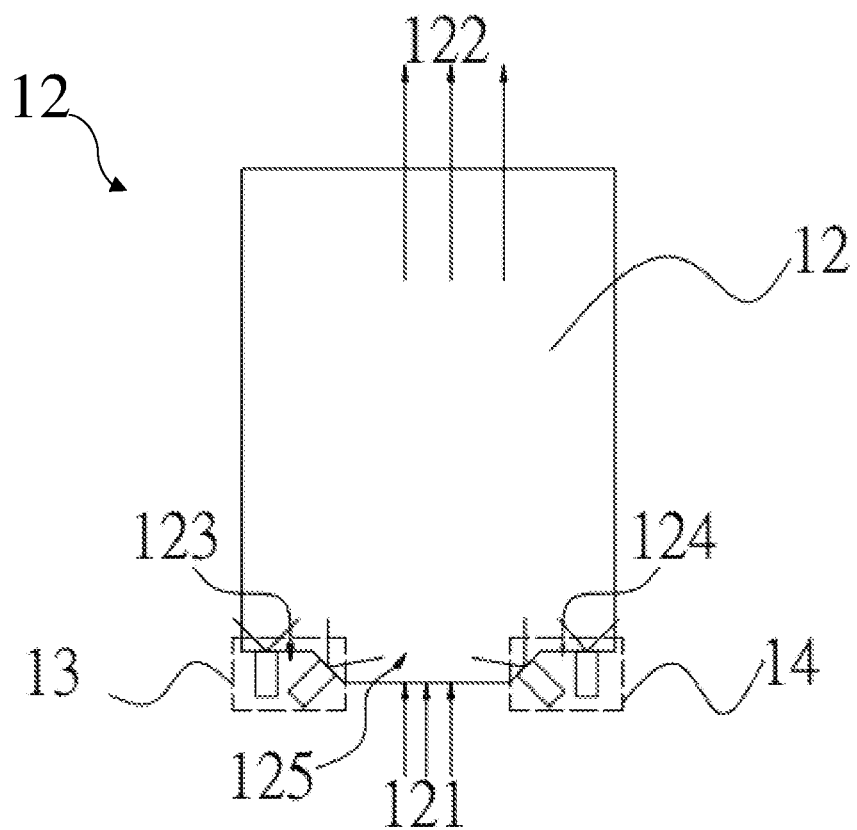
FIG. 4A is a schematic front view of another light guide plate by the first embodiment of the present invention.

Preferably, with reference to FIG. 4A, a difference of the light guide plate 12 by the embodiment of present invention from the light guide plate 12 in FIG. 3 is that: a first recessed portion 123 and a second recessed portion 124 are disposed on an edge of the light guide plate 12 close to the light incident surface 121. A protruding portion 125 is formed between the first recessed portion 123 and the second recessed portion 124. The protruding portion 125 is located on a central place of the light guide plate 12. However, positions of the first recessed portion 123, the second recessed portion 124 and the protruding portion 125 are not limited thereto, for example, the first recessed portion 123 and the second recessed portion 124 can be disposed on an inner side of the light guide plate 12.

Figure 4B:
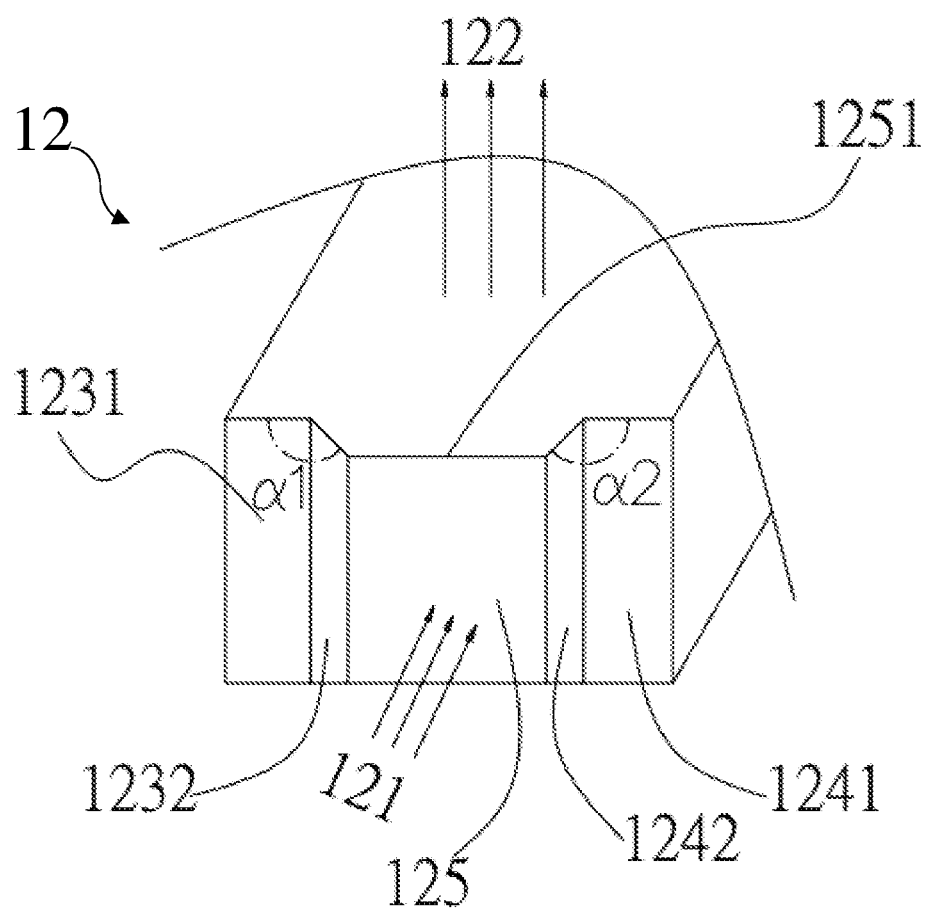

With reference to FIG. 4B, the first recessed portion 123 includes a first perpendicular surface 1231 and a first tilted surface 1232. The second recessed portion 124 includes a second perpendicular surface 1241 and a second tilted surface 1242. The first tilted surface 1232 and the second tilted surface 1242 are both connected to an edge 1251 of the protruding portion 125. The first perpendicular surface 1231 is perpendicular to the light emitting surface 122 of the light guide plate 12. Similarly, the second perpendicular surface 1241 is perpendicular to the light emitting surface 122 of the light guide plate. The first perpendicular surface 1231 and the second perpendicular surface 1241 can be located on the same plane, and can be located on different planes. The present invention embodiment should not be limited thereto.

A first included angle α1 is defined between the first tilted surface 1232 and the first perpendicular surface 1231, and the first included angle α1 is a non-acute angle. A second included angle α2 is defined between the second tilted surface 1242 and the second perpendicular surface 1241, and the second included angle α2 is a non-acute angle. Preferably, the first included angle α1 is 90°-135°, the second included angle α2 is 90°-135° such that light emitted from the first light source set 13 and the second light source set 14 enters the protruding portion 125 and makes light from the first light source set 13, the second light source set 14 into the light guide plate 12 become uniform to obtain better optical performance. In the present invention embodiment, the first included angle α1 can be the same as or different from the second included angle α2.

Figure 5A:
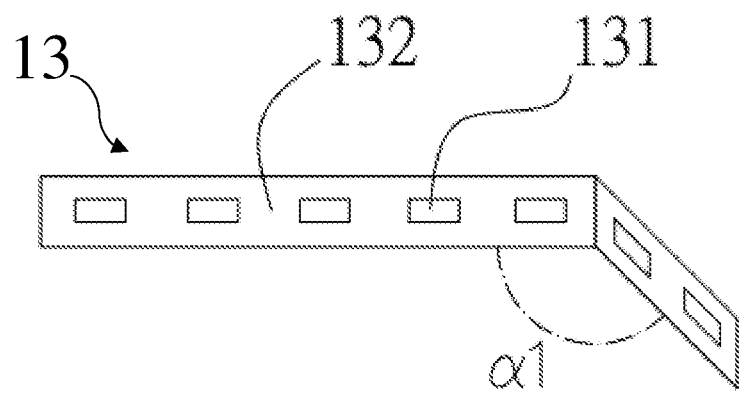
FIG. 5A is a schematic view of a first light source set by the first embodiment of the present invention.
Figure 5B:
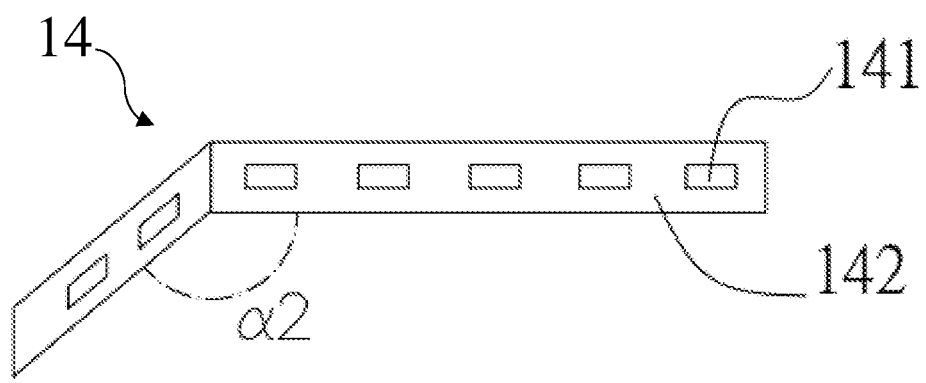
FIG. 5B is a schematic view of a second light source set by the first embodiment of the present invention.

Furthermore, with reference to FIGS. 5A and 5B, the first light source set 13 includes a plurality of light emitting diode (LED) lamps 131 disposed at even intervals along a length direction of the first light source set 13. The LED lamps 131 is disposed on the flexible printed circuit board 132. The flexible printed circuit board 132 is divided into a perpendicular section and a tilted section. The perpendicular section is opposite to the first perpendicular surface 1231. The tilted section is opposite to the first tilted surface 1232. An included angle between the perpendicular section and the tilted section is equal to the first included angle α1; the second light source set 14 includes a plurality of LED lamps 141 disposed at even intervals along a length direction of the second light source set 14. The LED lamps 141 is disposed on the flexible printed circuit board 142. The printed circuit board 142 is also divided into a perpendicular section and a tilted section. The perpendicular section is opposite to the second perpendicular surface 1241. The tilted section is opposite to the second tilted surface 1242. An included angle of the perpendicular section and the tilted section is equal to the second included angle α2. A number of the LED lamps on each section of the first light source set 13 and the second light source set 14 should be based on a width of a plane corresponding to the section.

Figure 6:
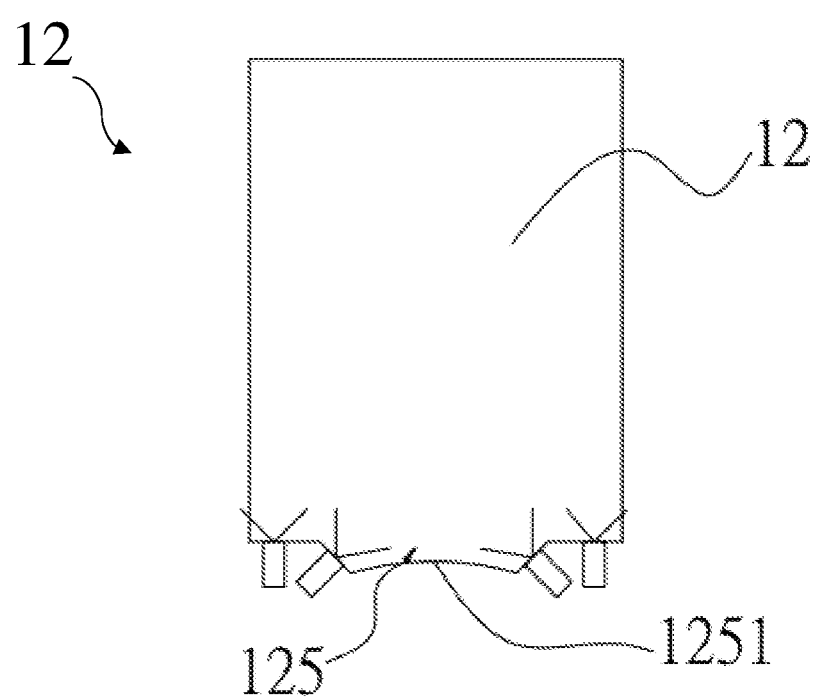
FIG. 6 is a schematic view of another light guide plate by the first embodiment of the present invention.

With reference to FIGS. 4A and 4B, an edge 1251 of the protruding portion 125 is linear. However, the present invention embodiment should not be limited to a shape of the edge 1251 of the protruding portion 125. For example, with reference to FIG. 6, a shape of the edge 1251 of the protruding portion 125 is a curved shape extending into the light guide plate 12, which further increase a height of the first notch 111 to narrow the lower bezel of the display device.

The backlight module 100 further includes: an optical film disposed on a side of the light emitting surface 122 of the light guide plate 12; a reflection plate disposed on a side of the light guide plate 12 facing away from the light emitting surface 122; a sealing glue frame disposed on the back plate 11, which will not be repeatedly hereinafter.

Second Embodiment

Figure 7:
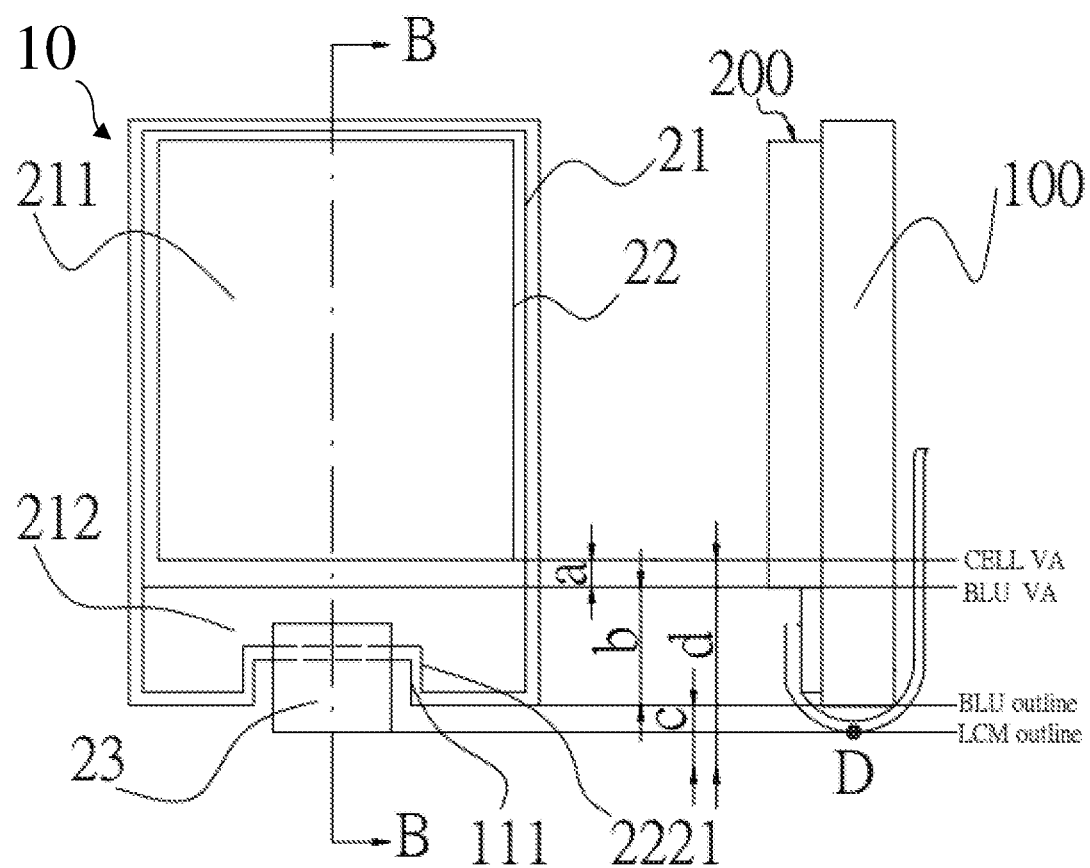
FIG. 7 is a schematic view of display device by a second embodiment of the present invention.

With reference to FIG. 7, the display device 10 by embodiment of the present invention includes the backlight module 100 and display panel 200 by the above first embodiment. The display panel 200 includes an array substrate 21, a color filter substrate 22 disposed opposite to the array substrate 21, and a chip-on-film 23 bonded to the array substrate 21. The array substrate 21 includes a displaying region 211 and a non-displaying region 212 located adjacent to the displaying region 211. A step region is formed between the array substrate 21 and the color filter substrate 22. The step region is the non-displaying region 212 of the array substrate 21. A second notch 2221 is defined in an end of the step region away from the displaying region 211. The chip-on-film 23 is bonded in the non-displaying region 212 close to a first edge of the second notch 2221. The chip-on-film 23 sequentially extends through the second notch 2221 and the first notch 111 to be folded to a back of the backlight module 100.

Similarly, a height d of a lower bezel (LCM outline) of the display device 10 is a distance from the displaying region (CELL VA) 211 to the lower edge of the display device 10, i.e., a sum of a distance a between the displaying region 211 and a viewable area of the backlight module 100, a distance b between the viewable area (BLU VA) of the backlight module 100 and a lower edge of the backlight module 100, and a distance c between the lower edge (BLU outline) of the backlight module 100 and the lower edge of the display device 10, i.e., d=a+b+c. Because a folding vertex D of the chip-on-film 23 is located out of the first notch 111 and the second notch 2221, (preferably, the chip-on-film 23 folding vertex D can be located in the first notch 111 and the second notch 2221), the distance between the edge of the backlight module 100 edge and the edge of the display device 10, can be less than a distance c (c can be zero) of a conventional display device such that a dimension of the lower bezel of the display device 10 in the embodiment of the present invention embodiment can be reduced when compared to the display device lower bezel, which further achieves narrow bezel and high screen ratio.

The second notch 2221 corresponds to the first notch 111. In general, an orthographic projection of the second notch 2221 on the backlight module 100 is located out of an orthographic projection of the first notch 111 on the backlight module 100 to protect the display panel 200. A shape of the second notch 2221 is the same as a shape of the first notch 111, i.e., the second notch 2221 is rectangular. The shapes of the second notch 102a and the first notch 101a can be different.

Figure 8:
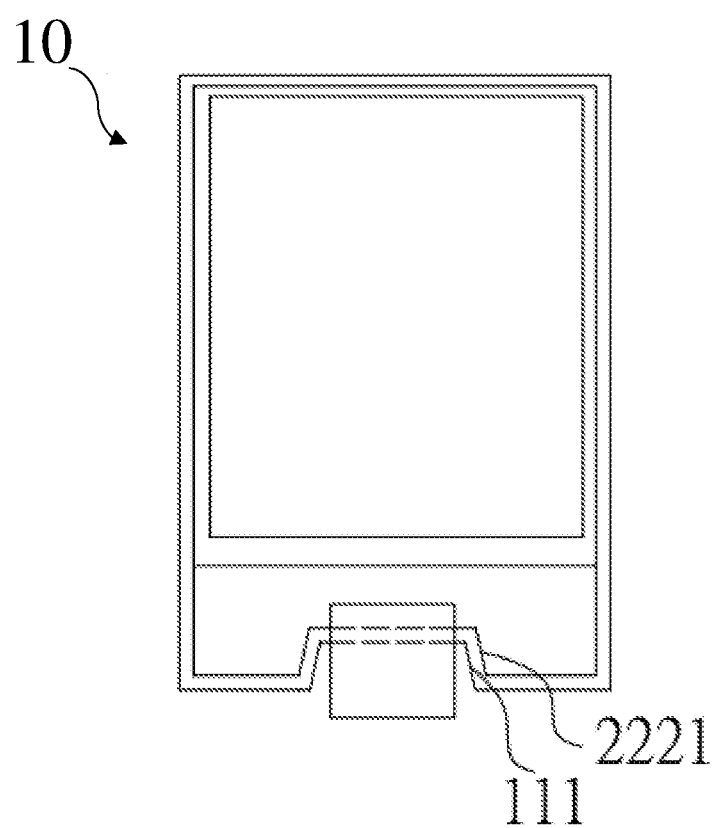
FIG. 8 is a schematic view of another display device by the second embodiment of the present invention.

With reference to FIG. 8, a different of the display device 10 by an embodiment of the present invention from the display device in FIG. 7 is that, both the first notch 111 and the second notch 2212 are trapezoidal to increase densities of the first light source set 13 and the second light source set 14 respectively disposed in the first light source disposing region and the second light source disposing region and to enhance display performance of the display device 10.

Advantages: The backlight module and the display device provided by the present invention, by defining the first notch in the back plate of the backlight module with the first notch corresponding to a second notch of the display panel and by placing the light source set on the back plate on two ends of the first notch, reduces the dimension of the lower bezel of the display device, increases the screen ratio of the display device, and simultaneously makes incident light from the backlight module to the display panel more uniform, which enhances the differential performance of the products and improves the market competitiveness of the products.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. A backlight module, comprising:
   a back plate; and
   a light guide plate disposed on the back plate, and the light guide plate comprising a light incident surface and a light emitting surface;
   wherein a first notch is defined in an end of the back plate close to the light incident surface of the light guide plate, the first notch divides two parts of the back plate on opposite sides of the first notch into a first light source disposing region and a second light source disposing region, the first notch is rectangular, wherein the first light source disposing region is installed with a first light source set, the second light source disposing region is installed with a second light source set, and light emitting sides of the first light source set and the second light source set are both disposed opposite to the light incident surface of the light guide plate;
   wherein a first recessed portion and a second recessed portion are disposed on an edge of the light guide plate close to the light incident surface, a protruding portion is formed between the first recessed portion and the second recessed portion, and a side surface of the protruding portion corresponds to the first notch.

2. The backlight module as claimed in claim 1, wherein a width of the first notch is 1%-50% of a width of the back plate.

3. The backlight module as claimed in claim 1, wherein the first recessed portion comprises a first perpendicular surface and a first tilted surface, the second recessed portion comprises a second perpendicular surface and a second tilted surface, the first tilted surface and the second tilted surface are both connected to an edge of the protruding portion.

4. The backlight module as claimed in claim 3, wherein a first included angle defined between the first tilted surface and the first perpendicular surface is a non-acute angle, and a second included angle defined between the second tilted surface and the second perpendicular surface is a non-acute angle.

5. The backlight module as claimed in claim 4, wherein the first included angle is 90°-135°, the second included angle is 90°-135°.

6. The backlight module as claimed in claim 1, wherein an edge of the protruding portion is linear or curved.

7. The backlight module as claimed in claim 1, wherein the protruding portion is located on a central place of the light guide plate.

8. A backlight module, comprising:
   a back plate; and
   a light guide plate disposed on the back plate, and the light guide plate comprising a light incident surface and a light emitting surface;
   wherein a first notch is defined in an end of the back plate close to the light incident surface of the light guide plate, the first notch divides two parts of the back plate on opposite sides of the first notch into a first light source disposing region and a second light source disposing region, wherein the first light source disposing region is installed with a first light source set, the second light source disposing region is installed with a second light source set, light emitting sides of the first light source set and the second light source set are both disposed opposite to the light incident surface of the light guide plate;
   wherein a first recessed portion and a second recessed portion are disposed on an edge of the light guide plate close to the light incident surface, a protruding portion is formed between the first recessed portion and the second recessed portion, and a side surface of the protruding portion corresponds to the first notch.

9. The backlight module as claimed in claim 8, wherein a width of the first notch is 1%-50% of a width of the back plate.

10. The backlight module as claimed in claim 8, wherein the first recessed portion comprises a first perpendicular surface and a first tilted surface, the second recessed portion comprises a second perpendicular surface and a second tilted surface, the first tilted surface and the second tilted surface are both connected to an edge of the protruding portion.

11. The backlight module as claimed in claim 10, wherein a first included angle defined between the first tilted surface and the first perpendicular surface is a non-acute angle, and a second included angle defined between the second tilted surface and the second perpendicular surface is a non-acute angle.

12. The backlight module as claimed in claim 11, wherein the first included angle is 90°-135°, the second included angle is 90°-135°.

13. The backlight module as claimed in claim 10, wherein an edge of the protruding portion is linear or curved.

14. The backlight module as claimed in claim 8, wherein the first light source set comprises a plurality of light emitting diode (LED) lamps disposed at even intervals along a length direction thereof, and the second light source set comprises a plurality of LED lamps disposed at even intervals along a length direction thereof.

15. The backlight module as claimed in claim 8, wherein the backlight module further comprises:
   an optical film disposed on a side of the light emitting surface of the light guide plate;
   a reflection plate disposed on a side of the light guide plate facing away from the light emitting surface; and
   a sealing glue frame disposed on the back plate.

16. A display device, comprising the backlight module as claimed in claim 8 and a display panel, the display panel comprises an array substrate, a color filter substrate disposed opposite to the array substrate and a chip-on-film bonded to the array substrate;
   the array substrate comprising a displaying region and a non-displaying region located adjacent to the displaying region;
   wherein a second notch is defined in an end of the non-displaying region away from the displaying region, the second notch corresponds to the first notch, the chip-on-film is bonded in the non-displaying region close to a first edge of the second notch, the chip-on-film sequentially extends through the second notch and the first notch and is folded to a back of the backlight module.

17. The display device as claimed in claim 16, wherein a folding vertex of the chip-on-film is located in the first notch and the second notch.

18. The display device as claimed in claim 16, wherein an orthographic projection of the second notch on the backlight module is located out of an orthographic projection of the first notch on the backlight module.

* * * * *